United States Patent [19]

Trotter et al.

[11] Patent Number: 4,576,997

[45] Date of Patent: Mar. 18, 1986

[54] ADHESIVE BLENDS

[75] Inventors: Jimmy R. Trotter; Richard L. McConnell, both of Kingsport, Tenn.

[73] Assignee: Eastman Kodak Company, Rochester, N.Y.

[21] Appl. No.: 650,471

[22] Filed: Sep. 14, 1984

[51] Int. Cl.$^4$ ............................................. C08L 67/02
[52] U.S. Cl. .................................... 525/444; 525/934
[58] Field of Search ............................... 525/444, 934

[56] References Cited

U.S. PATENT DOCUMENTS

| 4,012,363 | 3/1977 | Bruning | 528/308 |
| 4,094,721 | 6/1978 | Sturm | 428/480 |
| 4,131,714 | 12/1978 | Karkoski | 525/444 |
| 4,252,940 | 2/1981 | Sublett | 528/302 |
| 4,330,670 | 5/1982 | Sublett | 528/302 |

Primary Examiner—Lewis T. Jacobs
Assistant Examiner—Patricia Short
Attorney, Agent, or Firm—John F. Stevens; William P. Heath, Jr.

[57] ABSTRACT

Disclosed are adhesive compositions of (a) certain low-melting crystalline copolyesters or amorphous copolyesters having high glass transition temperatures with (b) certain very low melting highly crystalline aliphatic polyesters.

6 Claims, No Drawings

ADHESIVE BLENDS

DESCRIPTION

Field of the Invention

This invention relates to adhesive compositions of (a) certain low-melting crystallizable copolyesters or amorphous copolyesters having high glass transition temperatures with (b) certain very low melting highly crystalline aliphatic polyesters.

BACKGROUND OF THE INVENTION

Fabric adhesives are often used on fusible interlinings, which are materials such as fabric which have been coated on one side with a discontinuous pattern of adhesive. When the interlining is bonded to a face fabric in a garment, it provides body and shape to the garment without impairing the ability of the fabric to breathe. Fusible interlinings are used in the manufacture of suits, in shirt collars and cuffs, and in the waistbands of trousers. In the manufacture of suits, polycarbonate basting threads are frequently used to temporarily hold the parts of the suit in place. After the suit is completed, a solvent such as perchloroethylene or trichloroethylene is used to embrittle the polycarbonate thread so that it may be brushed from the fabric.

Binder fibers or polyester powders are frequently used to bond nonwovens, which are formed from matrix fibers into a web, sheet, or mat. The binder fibers or binder powders give strength to the web, mat, or sheet by bonding it together.

Certain polyesters are known to be useful for fusible interlining adhesives and binder fibers. For example, one polyester of interest is the copolyester of terephthalic acid, adipic acid, ethylene glycol and 1,4-butanediol as described in U.S. Pat. No. 3,699,921. Such polyesters tend to block in pellet form and fumed silica must be added in significant amounts to make it possible to grind this polymer into powder. Excessive amounts of fumed silica in the powder, however, prevent good coatability and good fusion of the powders on the fusible interlining fabric when applied with powder point applicators.

Copolyesters generally have lower melting points than homopolyesters. For example, the melting point of a polyester of terephthalic acid and ethylene glycol is around 260° C. A polyester consisting of 90 mole % of terephthalic acid and 10 mole % of isophthalic acid in which ethylene glycol has been used as the diol component, has a melting point of 236° C. When the molar ratio of terephthalic acid to isophthalic acid is 80:20, a copolyester is obtained which has a melting point of 210° C. When the ratio of terephthalic acid to isophthalic acid is 70:30 the melting point drops to 185° C.

Conditions are similar when ethylene glycol is replaced by 1,4-butanediol. A polybutylene terephthalate comparable to polyethylene terephthalate has a melting point of 225° C.

In German Offenlegungsschrift No. 1,920,432 there is disclosed a dry-cleaning fluid resistant polyester fusion adhesive prepared from terephthalic acid, adipic acid, ethylene glycol, and 1,4-butanediol. The degree of crystallization of this copolyester, however, is already so low that it is not suitable for a fusion adhesive. Disadvantages reside in both the surface stickiness of the coated substrate and the stickiness of the copolyesters which is considerable even at room temperature. Copolyesters of this type are not suitable for the preparation of adhesives in powder form.

U.S. Pat. No. 4,252,940 discloses copolyester adhesives of terephthalic acid together with isophthalic, succinic, adipic or glutaric, and a blend of 1,6-hexanediol and diethylene glycol.

It is well known in the art that the crystallinity of a polyester is one parameter which may be used to determine solvent resistance, i.e., the more amorphous (less crystalline), the more susceptible to drycleaning solvents the polyester will be. Also, glass transition temperature is a parameter by which the temperature at which a polyester, even an amorphous polyester, will be affected by a solvent.

It is also known that modification of a homopolyester by copolymerization with other acid or glycol moieties or combinations of glycol and acid moieties to form copolymers or terpolymers drastically reduces or eliminates crystallinity. The crystallinity of copolyesters is also dependent on the particular comonomers from which the copolyester is synthesized. For example, a polyester of terephthalic acid and 1,4-buanediol (even number of carbon atoms) will crystallize more readily than a polyester prepared from terephthalic acid and either 1,3-propanediol (odd number carbon atoms) or 1,5-pentanediol (odd number of carbon atoms). The crystallization phenomenon of copolyesters, especially those that are low melting, below 150° C., is unpredictable.

Amorphous polyesters generally cannot be used as fusion adhesives in which resistance to dry-cleaning agents and high set-up speed are required. In like manner, those polyesters are undesirable which have too little crystallinity, because they solidify too slowly and consequently do not lose their surface stickiness for long periods of time.

Other copolyesters of interest are those disclosed in U.S. Pat. Nos. 4,094,721; 3,948,859; 4,012,363; and 3,853,665.

Certain low melting, crystallizable polyesters are useful for bonding fabrics at temperatures (120°–150° C.) which do not damage the fabrics. These bonds generally show excellent resistance to laundering and dry cleaning treatments. Thus, these materials are useful in film, fusible interlining, or melt blown web form to laminate fabrics in the construction of wearing apparel. However, in certain industrial lamination applications where high temperature resistance is required, the low melting polyesters are not completely satisfactory. In some applications, there is a need for rapid and complete fusion of powdered adhesives which have been applied to woven or nonwoven fabrics. The adhesives should fuse readily at temperatures in the range of 130°–150° C. and then solidify to provide a non-tacky, non-dusting adhesive coating which can be subsequently bonded or laminated to face fabrics in heated presses or by dielectric bonding techniques. Such laminates may frequently be required to retain good bond strength at elevated temperatures, such as at 80° C.

Also, there are applications in which it would be highly desirable to be able to fuse and to make bonds with polyester adhesives at temperatures substantially lower than 120° C. For example, in laminating fabrics in older stream presses, the temperature may never exceed the 90°–100° C. range.

DISCLOSURE OF THE INVENTION

It has now been found that certain low-melting crystallizable polyesters having melting points of about 80° to 190° C. or certain substantially amorphous polyesters having relatively high glass transition temperatures (Tg=about 50 or higher) can be used in conjunction with highly crystalline aliphatic homo- or copolyesters to provide useful, low melting adhesives.

The adhesive compositions of this invention comprise a blend in particulate form of about 5–95% by wt. of (a), (b), or mixtures thereof with about 95–5% by weight of (c), described as follows:

(a) a crystallizable copolyester having a melting point of about 80°–190° C., a heat of fusion of less than 10 calories per gram and an I.V. (inherent viscosity) of about 0.4–1.2, the copolyester being derived from an acid component of at least 50 mole % terephthalic acid and a glycol component selected from the group consisting of 1,4-butanediol, 1,6-hexanediol and mixtures of 1,4-butanediol and 1,6-hexanediol, the copolyester also being derived from about 20–60 mole % of a co-acid or a co-glycol, or about 20–75 mole % of a combination of a co-acid and a co-glycol, the co-acid and co-glycol being selected from the group consisting of isophthalic acid, $C_3$–$C_{12}$ aliphatic dibasic acids, aliphatic and cycloaliphatic glycols having 2–8 carbon atoms and diethylene glycol;

(b) a substantially amorphous copolyester having a glass transition temperature of 50° C. or higher, a heat of fusion of less than 1 calorie per gram and an I.V. of about 0.4–1.2, the copolyesters being derived from at least one acid selected from the group consisting of terephthalic acid, isophthalic acid, and 1,4-cyclohexanedicarboxylic acid, and at least one glycol selected from the group consisting of ethylene glycol, diethylene glycol, and 1,4-cyclohexanedimethanol, with the proviso that the copolyester contains at least two acids or at least two glycols, the second acid or glycol being present in an amount of about 25–60 mole %; and (c) a highly crystallizable aliphatic homo- or copolyester having a melting point of about 40°–90° C., an I.V. of about 0.4–1.5 and a heat of fusion of greater than 10 cal/g., said homo- or copolyester being derived from at least one aliphatic dibasic acid having 4 to 12 carbon atoms and at least one aliphatic glycol having 2 to 8 carbon atoms.

It has been found that the adhesive composition containing the highly crystalline aliphatic polyester allows the adhesive composition to be fused and/or bonded at lower temperatures or at significantly reduced fusion times than unmodified polyester composition.

Examples of crystallizable copolyesters of particular interest include poly(butylene terephthalate) copolyesters containing about 20 mole % glutaric acid and about 45 mole % diethylene glycol, poly(butylene terephthalate) copolyesters containing about 30 mole % glutaric acid and about 45 mole % diethylene glycol, poly(butylene terephthalate) copolyesters containing about 25 mole % glutaric acid and about 40 mole % diethylene glycol, poly(hexamethylene terephthalate) copolyesters containing about 20 mole % isophthalic acid and about 20 mole % 1,4-butanediol, poly(hexamethylene terephthalate) copolyesters containing about 10 mole % isophthalic acid and about 40 mole % 1,4-butanediol, poly(hexamethylene terephthalate) copolyesters containing about 20 mole % 1,4-butanediol, poly(butylene terephthalate) copolyesters containing about 50 mole % isophthalic acid, poly(butylene 1,4-cyclohexanedicarboxylate) copolyesters containing about 25 mole % glutaric acid and about 25 mole % diethylene glycol, poly(hexamethylene terephthalate) copolyesters containing about 20 mole % glutaric acid and about 20 mole % diethylene glycol and the like.

Substantially amorphous copolyesters of particular interest include polyesters having Tg values above about 50° C., preferably about 50°–90° C., heats of fusion ($\Delta H_f$) of less than about one calorie per gram and inherent viscosities of about 0.4 to about 1.2. Some typical polymers include poly(ethylene terephthalate) copolyesters containing about 31 mole % 1,4-cyclohexanedimethanol, poly(1,4-cyclohexylenedimethylene terephthalate) copolyesters containing about 40 mole % ethylene glycol, poly(1,4-cyclohexylenedimethylene terephthalate) copolyesters containing about 50 mole % isophthalic acid, poly(ethylene isophthalate) copolyesters containing about 50 mole % 1,4-cyclohexanedimethanol, poly(ethylene 1,4-cyclohexanedicarboxylate) copolyesters containing about 50 mole % 1,4-cyclohexanedimethanol, poly(ethylene terephthalate) copolyesters containing about 37 mole % diethylene glycol, and the like.

The low melting, crystallizable copolyesters (a) or the substantially amorphous, high Tg copolyesters (b) and the highly crystalline aliphatic polyesters (c) may be used in the form of powder blends, pellet blends or melt blends which have been pelletized or reduced to powder form. In general, the concentration of polymer (a) or (b) or combinations thereof may range from about 5 to about 95 weight % but the preferred range is about 10 to about 90 weight % based on the total polymer weight.

A typical crystallizable copolyester prepared in accordance with this invention is as follows: Fifty-three and thirty-five hundredths grams of dimethyl terephthalate (0.275 mole), 36 grams (0.225 mole) of dimethyl glutarate, 55.35 grams (0.615 mole) of 1,4-butanediol, 40.8 grams (0.385 mole) of diethylene glycol, and 1 mL of n-butanol solution of titanium tetraisopropoxide which is 1.24 wt. % titanium are weighed into a 500-mL single-neck round-bottom flask equipped with a nitrogen inlet, stirrer, vacuum outlet, and a condensing flask. The flask is heated at 200° C. in a Belmont metal bath for three hours with a nitrogen sweep over the reaction mixture. When the theoretical amount of methanol has distilled from the reaction mixture, the metal bath temperature is increased to 255° C. at a reduced pressure of 0.5 to 0.1 mm of mercury for one hour. The flask is then removed from the bath and allowed to cool as the polyester crystallizes. Gas chromatographic analysis of the hydrolyzed copolyester reveals the copolyester contains the following mole percentages of reaction residues: dimethyl terephthalate, 55 mole %; dimethyl glutarate, 45 mole %; 1,4-butanediol, 70 mole %; and diethylene glycol, 30 mole %. The copolyester has an inherent viscosity of 1.0 and a crystalline melting point of 115° C. (DSC). The crystallization half time of this copolyester is 1.2 minutes at 60° C. Other crystallizable copolyesters may be made using the same technique, as is well known in the art.

Typical substantially amorphous copolyesters which may be used in accordance with this invention are commercially available. For example, a copolyester of terephthalic acid and ethylene glycol modified with 1,4-cyclohexanedimethanol is particularly useful. Such substantially amorphous polyesters may be produced in accordance with known techniques, such as taught in U.S. Pat. No. 2,901,466, incorporated herein by reference.

The very low melting, highly crystalline aliphatic polyester component of the new blends may contain crystallizable moieties with crystalline melting points of about 40° to about 90° C. with heats of fusion >10 cal/g. The aliphatic polyesters may be homopolyesters or copolyesters which have melting points and levels of crystallinity in the specified ranges. The aliphatic polyesters of this invention are prepared with aliphatic dibasic acids such as succinic, glutaric, adipic, 1,12-dodecanedioic acid, and the like. Useful glycols used to prepare the aliphatic polyesters include ethylene glycol, 1,4-butanediol, 1,5-pentanediol, 1,6-hexanediol, 1,4-cyclohexanedimethanol, and the like. Useful aliphatic polyesters may have I.V. values ranging from about 0.4 to about 1.5, but preferred polymers have I.V. values of 0.5 to 1.4.

The polyester components of this invention are readily prepared using typical polycondensation reaction conditions. They may be made by either batch or continuous processes. Typical polyesterification catalysts which may be used include titanium alkoxides, dibutyl tin dilaurate, combinations of zinc, manganese, or magnesium acetates or benzoates with antimony oxide or antimony triacetate.

The blends of this invention can be prepared by the physical mixing of powders of the desired particle size of the components or by melt blending of the components. Powder blends having particle sizes of 70–200 mesh may be used to prepare fusible interlinings by the powder point or random sprinkling technique; these interlinings are used in turn in the manufacture of clothing. Powder blends having particle sizes of 40–70 mesh may be randomly sprinkled onto a bonded polyester nonwoven pad; the powder may then be lightly fused on the pad; the coated pad is then bonded to fabric backed PVC sheeting or other automotive body cloth fabrics. The melt blends may be used in powder form for fusible interlinings, applied in hot-melt form from extruders or gear pump applicators, or extruded into film form or melt blown web form for use in laminating or bonding substrates.

The crystalline melting point, $\Delta H_f$, and $T_g$ referred to above are measured by conventional means using a Differential Scanning Calorimeter.

Ester forming derivatives of the acids referred to herein can be employed, if desired, to prepare the copolyesters of this invention. Examples of such ester forming derivatives are the anhydrides, esters and acid chlorides of such acids.

The "heat of fusion", $\Delta H_f$, of polymers is the amount of heat absorbed when crystallizable polymers are melted. $\Delta H_f$ values are readily obtained using Differential Scanning Calorimeters (DSC) (Perkin-Elmer). For example, one method for determining $\Delta H_f$ is described in *Journal of Applied Polymer Science*, 20 1209 (1976). Measurement of $\Delta H_f$ is also described in DuPont Thermal Analysis Bulletin No. 900-8 (1965). Qualitatively, it is possible to compare the degree of crystallinity of polymers by comparing their $\Delta H_f$ values.

When the polyester adhesives prepared as described above are employed as melt adhesives to laminate various fabric systems, metal strips and the like, excellent bonds result. These bonds are found to be highly resistant to the action of dry cleaning solvents such as perchloroethylene. The strength of the bonds is determined by a peel test based on the ASTM "T-Peel Test" set forth on pages 609–611 of the 1972 edition of the BOOK OF ASTM STANDARDS, published by the American Society for Testing Materials, and more specifically identified as Test Number D-1876-69. Results are averages of three specimens.

If desired, dyes or dye receptive agents, color stabilizers and various other adjuvants may be added to the adhesives to meet certain specific end use requirements.

Where it is stated herein that a polyester contains repeat units from certain acids or glycols, it is understood that the polyester is derived at least in part from those acids or glycols.

As used herein, the inherent viscosity (I.V.) of the copolyester is measured at 25° C. using 0.50 gram of copolyester per 100 ml. of a solvent consisting of 60 percent by weight phenol and 40 percent by weight tetrachloroethane.

The following examples are submitted for a better understanding of the invention.

EXAMPLE 1

A powder blend is prepared by thoroughly dry blending powders (70–200 U.S. mesh) of a poly(butylene terephthalate) copolyester containing 30 mole % glutaric acid and 45 mole % diethylene glycol [Polymer A (0.83 I.V.; Tm=110° C.; $\Delta H_f$=2.5 cal/g); 90 grams] with poly(butylene adipate) [0.71 I.V.; Tm=57° C.; $\Delta H_f$=15.5 cal/g; 10 grams]. Powderpoint fusible interlinings are prepared with the powder blend on a small-scale laboratory powderpoint machine with a heated roll temperature of 180° C. The powder is fused onto the cotton interlining fabric using a bank of quartz heaters controlled through a variac; a variac setting of 40% is used to fuse this powder blend onto the cotton interlining fabric. The resulting fusible interlining has an adhesive coating weight of 22.7 g/yd².

Fabric bonds are made with the fusible interlining on 100% polyester twill fabric with an electrically-heated garment press using a bonding temperature of 120° C. and a dwell time of 15 seconds. An initial fabric bond T-peel strength of 1.9 lb/in.-width is obtained at 23° C. using a peel rate of 12 in./min. These bonded fabric samples retain good bond strength after five cycles of dry cleaning in perchloroethylene or after five cycles of laundering in 71° C. water.

When using unmodified Polymer A powder to prepare a fusible interlining, a fusion oven variac setting of 70% is used to fuse the powder onto the cotton interlining fabric. A fusible interlining (18.7 g/yd²) made with unmodified Polymer A produces fabric bond T-peel strengths of 1.6 lb/in.-width when bonds are made as above.

Similarly good results are achieved when using a poly(hexamethylene terephthalate) copolyester containing 20 mole % isophthalic acid moiety and 20 mole % 1,4-butanediol moiety (0.72 I.V.; Tm =104° C.; $\Delta H_f$=6 cal/g; Tg=13° C.) instead of Polymer A.

This example demonstrates that the powder blend can be fused at a much lower fusion oven temperature than that required for unmodified Polymer A powder.

EXAMPLE 2

A powder blend is prepared by thoroughly dry blending powders (70–200 U.S. mesh) of a poly(butylene terephthalate) copolyester containing 30 mole % glutaric acid and 45 mole % diethylene glycol [Polymer A (0.83 I.V.; Tm=110° C.; $\Delta H_f$=2.5 cal/g); 75 grams]

with poly(butylene adipate) [0.71 I.V.; Tm=57° C.; $\Delta H_f$=15.5 cal/g; 25 grams]. Powder-point fusible interlinings are prepared with the powder blend on a small-scale laboratory powderpoint machine with a heated roll temperature of 180° C. The powder is fused onto the cotton interlining fabric using a bank of quartz heaters controlled through a variac; a variac setting of 50% is used to fuse this powder blend onto the cotton interlining fabric. The resulting fusible interlining has an adhesive coating weight of 18.8 g/yd².

Fabric bonds are made with the fusible interlining on 100% polyester twill fabric with an electrically-heated garment press using a bonding temperature of 120° C. and a dwell time of 15 seconds. An initial fabric bond T-peel strength of 1.4 lb/in.-width is obtained at 23° C. using a peel rate of 12 in./min.

Similarly good results are achieved when using a poly(hexamethylene terephthalate) copolyester containing 10 mole % isophthalic acid moiety and 36 mole % 1,4-butanediol moiety (0.69 I.V.; Tm=117° C.; $\Delta H_f$=7.0 cal/g; Tg=17° C.) instead of Polymer A.

EXAMPLE 3

A powder blend is prepared by thoroughly dry blending powders (70-200 U.S. mesh) of a poly(butylene terephthalate) copolyester containing 30 mole % glutaric acid and 45 mole % diethylene glycol [Polymer A (0.83 I.V.; Tm=110° C.; $\Delta H_f$=2.5 cal/g); 90 grams] with poly(hexamethylene adipate) [0.65 I.V.; Tm=58° C.; $\Delta H_f$=18.2 cal/g; 10 grams]. Powderpoint fusible interlinings are prepared with the powder blend on a small-scale laboratory powderpoint machine with a heated roll temperature of 180° C. The powder is fused onto the cotton interlining fabric using a bank of quartz heaters controlled through a variac; a variac setting of 55% is used to fuse this powder blend onto the cotton interlining fabric. The resulting fusible interlining has an adhesive coating weight of 17.2 g/yd².

Fabric bonds are made with the fusible interlining on 100% polyester twill fabric with an electrically-heated garment press using a bonding temperature of 120° C. and a dwell time of 15 seconds. An initial fabric bond T-peel strength of 1.3 lb/in.-width is obtained at 23° C. using a pecl rate of 12 in./min.

EXAMPLE 4

A powder blend is prepared by thoroughly dry blending powders (70-200 U.S. mesh) of a poly(butylene terephthalate) copolyester containing 30 mole % glutaric acid and 45 mole % diethylene glycol [Polymer A (0.83 I.V.; Tm=110° C.; $\Delta H_f$=2.5 cal/g); 75 grams] with poly(hexamethylene adipate) [0.65 I.V.; Tm=58° C.; $\Delta H_f$=18.2 cal/g; 25 grams]. Powder-point fusible interlinings are prepard with the powder blend on a small-scale laboratory powderpoint machine with a heated roll temperature of 180° C. The powder is fused onto the cotton interlining fabric using a bank of quartz heaters controlled through a variac; a variac setting of 50% is used to fuse this powder blend onto the cotton interlining fabric. The resulting fusible interlining has an adhesive coating weight of 18.4 g/yd².

Fabric bonds are made with the fusible interlining on 100% polyester twill fabric with an electrically-heated garment press using a bonding temperature of 120° C. and a dwell time of 15 seconds. An initial fabric bond T-peel strength of 1.7 lb/in.-width is obtained at 23° C. using a peel rate of 12 in./min.

EXAMPLE 5

A powder blend is prepared by thoroughly dry blending powders (70-200 U.S. mesh) of a poly(butylene terephthalate) copolyester containing 30 mole % glutaric acid and 45 mole % diethylene glycol [Polymer A (0.83 I.V.; Tm=110° C.; $\Delta H_f$=2.5 cal/g); 90 grams] with poly(ethylene dodecanedioate) [0.66 I.V.; Tm=87° C.; $\Delta H_f$=20.2 cal/g; 10 grams]. Powder-point fusible interlinings are prepared with the powder blend on a small-scale laboratory powder-point machine with a heated roll temperature of 180° C. The powder is fused onto the cotton interlining fabric using a bank of quartz heaters controlled through a variac; a variac setting of 65% is used to fuse this powder blend onto the cotton interlining fabric. The resulting fusible interlining has an adhesive coating weight of 19.6 g/yd².

Fabric bonds are made with the fusible interlining on 100% polyester twill fabric with an electrically-heated garment press using a bonding temperature of 120° C. and a dwell time of 15 seconds. An initial fabric bond T-peel strength of 1.2 lb/in.-width is obtained at 23° C. using a peel rate of 12 in./min.

EXAMPLE 6

A powder blend is prepared by thoroughly dry blending powders (70-200 U.S. mesh) of a poly(butylene terephthalate) copolyester containing 30 mole % glutaric acid and 45 mole % diethylene glycol [Polymer A (0.83 I.V.; Tm=110° C.; $\Delta H_f$=2.5 cal/g); 90 grams] with poly(butylene dodecanedioate) [0.56 I.V.; Tm=74° C.; $\Delta H_f$=24.7 cal/g; 10 grams]. Powder-point fusible interlinings are prepared with the powder blend on a small-scale laboratory powderpoint machine with a heated roll temperature of 180° C. The powder is fused onto the cotton interlining fabric using a bank of quartz heaters controlled through a variac; a variac setting of 55% is used to fuse this powder blend onto the cotton interlining fabric. The resulting fusible interlining has an adhesive coating weight of 18.0 g/yd².

Fabric bonds are made with the fusible interlining on 100% polyester twill fabric with an electrically-heated garment press using a bonding temperature of 120° C. and a dwell time of 15 seconds. An initial fabric bond T-peel strength of 1.4 lb/in.-width is obtained at 23° C. using a peel rate of 12 in./min.

EXAMPLE 7

A powder blend is prepared by thoroughly dry blending powders (70-200 U.S. mesh) of a poly(butylene terephthalate) copolyester containing 30 mole % glutaric acid and 45 mole % diethylene glycol [Polymer A (0.83 I.V.; Tm=110° C.; $\Delta H_f$=2.5 cal/g); 75 grams] with poly(butylene dodecanedioate) [0.56 I.V.; Tm=74° C.; $\Delta H_f$=24.7 cal/g; 25 grams]. Powder-point fusible interlinings are prepared with the powder blend on a small-scale laboratory powder-point machine with a heated roll temperature of 180° C. The powder is fused onto the cotton interlining fabric using a bank of quartz heaters controlled through a variac; a variac setting of 45% is used to fuse this powder blend onto the cotton interlining fabric. The resulting fusible interlining has an adhesive coating weight of 18.1 g/yd².

Fabric bonds are made with the fusible interlining on 100% polyester twill fabric with an electrically-heated press using a bonding temperature of 120° C. and a dwell time of 15 seconds. An initial fabric bond T-peel strength of 1.3 lb/in.-width is obtained at 23° C. using a peel rate of 12 in./min.

EXAMPLE 8

A melt blend is prepared by blending pellets of a poly(ethylene terephthalate) copolyester containing 31 mole % of 1,4-cyclohexanedimethanol moiety [Polymer B (0.60 I.V.; Tg=80° C.); 41.25 grams] with pellets of poly(ethylene dodecanedioate) [0.86 I.V.; Tm=87° C.; $\Delta H_f$=20 cal/g; 13.75 grams] in a Brabender Plastograph mixer at 190° C. for 10 minutes under a nitrogen atmosphere. Films of the blend, 5-7 mils thick, are prepared using a heated Wabash hydraulic press at 190° C. The films are then used to prepare T-peel bonds on 65/35 polyester/cotton twill fabric with a Sentinel heat sealer using a bonding temperature of 180° C., a dwell time of 4 seconds, and a bonding pressure of 15 psi. An initial fabric bond strength of 9.7 lb/in.-width is obtained at 23° C. using a peel rate of 2 in./min.

When using 5-7 mil films of unmodified Polymer B to prepare fabric T-peel bonds, an initial fabric bond T-peel strength of only 6.5 lb/in.-width is obtained at a bonding temperature of 180° C. (with 4 seconds dwell time and 15 psi). A bonding temperature of $\geq$200° C. is required to obtain the maximum bond strength with films of unmodified Polymer B; bonding temperatures of $\geq$200° C. are undesirable since most fabrics will be damaged at these high temperatures.

Similarly good results are achieved when using a poly(ethylene terephthalate) copolyester containing 37 mole % diethylene glycol moiety (0.66 I.V.; Tg=55° C.) instead of Polymer B.

EXAMPLE 9

A melt blend is prepared by blending pellets of a poly(ethylene terephthalate) copolyester containing 31 mole % of 1,4-cyclohexanedimethanol moiety [Polymer B (0.60 I.V.; Tg=80° C.); 27.5 grams] with pellets of poly(ethylene dodecanedioate) [0.86 I.V.; Tm=87° C.; $\Delta H_f$=20 cal/g; 27.5 grams] in a Brabender Plastograph mixer at 190° C. for 10 minutes under a nitrogen atmosphere. Films of the blend, 5-7 mils thick, are prepared using a heated Wabash hydraulic press at 190° C. The films are then used to prepare T-peel bonds on 65/35 polyester/cotton twill fabric with a Sentinel heat sealer using a bonding temperature of 140° C., a dwell time of 2 seconds, and a bonding pressure of 15 psi. An initial fabric bond strength of 6.0 lb/in.-width is obtained at 23° C. using a peel rate of 2 in./min. A bond strength of 6.5 lb/in.-width is obtained when a bonding temperature of 100° C., a dwell time of 4 seconds, and 15 psi pressure is used to make bonds.

When using 5-7 mil films of unmodified Polymer B to prepare fabric T-peel bonds, an initial fabric bond T-peel strength of 1.0 lb/in.-width is obtained at a bonding temperature of 140° C. (with 2 seconds and 15 psi). A bonding temperature of $\geq$200° C. is required to obtain the maximum bond strength with films of unmodified Polymer B.

EXAMPLE 10

A melt blend is prepared by blending pellets of a poly(ethylene terephtalate) copolyester containing 31 mole % of 1,4-cyclohexanedimethanol moiety [Polymer B (0.60 I.V.; Tg=80° C.); 13.75 grams] with pellets of poly(ethylene dodecanedioate) [0.86 I.V.; Tm=87° C.; $\Delta H_f$=20 cal/g; 41.25 grams] in a Brabender Plastograph mixer at 190° C. for 10 minutes under a nitrogen atmosphere. Films of the blend, 5-7 mils thick, are prepared using a heated Wabash hydraulic press at 190° C. The films are then used to prepare T-peel bonds on 65/35 polyester/cotton twill fabric with a Sentinel heat sealer using a bonding temperature of 120° C., a dwell time of 2 seconds, and a bonding pressure of 15 psi. An initial fabric bond strength of 9.3 lb/in.-width is obtained at 23° C. using a peel rate of 2 in./min. A bond strength of 6.1 lb/in.-width is obtained when a bonding temperature of 100° C., a dwell time of 2 seconds, and 15 psi pressure is used to make bonds.

When using 5-7 mil films of unmodified Polymer B to prepare fabric T-peel bonds, an initial fabric bond T-peel strength of 0.0 lb/in.-width is obtained at a bonding temperature of 120° C. A bonding temperature of $\geq$200° C. is required to obtain the maximum bond strength with films of unmodified Polymer B.

Similarly good results are achieved when using a poly(ethylene dodecanedioate) copolyester containing 5 mol % 1,4-butanediol moiety (0.65 I.V.; Tm=80° C.; $\Delta H_f$=18 cal/g) instead of poly(ethylene dodecanedioate) polyester in the blend with Polymer B.

This example demonstrates that much lower bonding temperatures can be used with the polymer blends.

EXAMPLE 11

A melt blend is prepared by blending pellets of a poly(ethylene terephthalate) copolyester containing 31 mole % of 1,4-cyclohexanedimethanol moiety [Polymer B (0.60 I.V.; Tg=80° C.); 41.25 grams] with pellets of poly(butylene adipate) [0.70 I.V.; Tm=57° C.; $\Delta H_f$=16 cal/g; 13.75 grams] in a Brabender Plastograph mixer at 190° C. for 10 minutes under a nitrogen atmosphere. Films of the blend, 5-7 mils thick, are prepared using a heated Wabash hydraulic press at 190° C. The films are then used to prepare T-peel bonds on 65/35 polyester/cotton twill fabric with a Sentinel heat sealer using a bonding temperature of 180° C., a dwell time of 4 seconds, and a bonding pressure of 15 psi. An initial fabric bond strength of 12.8 lb./in.-width is obtained at 23° C. using a peel rate of 2 in./min.

When using 5-7 mil films of unmodified Polymer B to prepare fabric T-peel bonds, an initial fabric bond T-peel strength of 6.5 lb/in.-width is obtained at a bonding temperature of 180° C. (4 seconds and 15 psi). A bonding temperature of $\geq$200° C. is required to obtain the maximum bond strength with films of unmodified Polymer B.

Similarly good results are achieved when using a poly(hexamethylene dodecanedioate) copolyester containing 5 mole % adipic acid moiety (0.54 I.V.; Tm=63° C.; $\Delta H_f$=14 cal/g) instead of poly(butylene adipate) polyester in the blend with Polymer B.

EXAMPLE 12

A melt blend is prepared by blending pellets of a poly(butylene terephthalate) copolyester containing 30 mole % azelaic acid moiety [Polymer C (0.56 I.V.; Tm=169° C.; $\Delta H_f$=7.4 cal/g); 27.5 grams] with pellets of poly(ethylene dodecanedioate) [0.86 I.V.; Tm=87° C.; $\Delta H_f$=20 cal/g; 27.5 grams] in a Brabender Plastograph mixer at 190° C. for 10 minutes under a nitrogen atmosphere. Films of the blend, 5-7 mils thick, are prepared using a heated Wabash hydraulic press at 190° C. The films are then used to prepare T-peel bonds on 65/35 polyester/cotton twill fabric with a Sentinel heat sealer using a bonding temperature of 160° C., a dwell time of 4 seconds, and a bonding pressure of 15 psi. An initial fabric bond strength of 6.5 lb/in.-width is obtained at 23° C. using a peel rate of 2 in./min.

When using 5-7 mil films of unmodified Polymer C to prepare fabric T-peel bonds, it was not possible to obtain fabric bonds using a bonding temperature of 160° C. A bonding temperature of 205° C. is required to obtain the optimum bond strength with films of unmodified Polymer C.

Similarly good results are achieved when using a poly(1,4-cyclohexylenedimethylene adipate) copolyester containing 10 mole % 1,12-dodecanedioic acid moiety (0.39 I.V.; Tm=81° C.; $\Delta H_f 32$ 10.5 cal/g) instead of the poly(ethylene dodecanedioate) polyester in the blend with Polymer C.

EXAMPLE 13

A melt blend is prepared by blending pellets of a poly(ethylene terephthalate) copolyester containing 31 mole % of the 1,4-cyclohexanedimethanol moiety [Polymer B (0.60 I.V.; Tg=80° C.); 13.75 grams] with pellets of poly(butylene adipate) [0.70 I.V.; Tm=57° C.; $\Delta H_f=16$ cal/g; 41.25 grams] in a Brabender Plastograph mixer at 190° C. for 10 minutes under a nitrogen atmosphere. Films of the blend, 5-7 mils thick, are prepared using a heated Wabash hydraulic press at 190° C. The films are then used to prepare T-peel bonds on 65/35 polyester/cotton twill fabric with a Sentinel heat sealer using a bonding temperature of 120° C., a dwell time of 4 seconds, and a bonding pressure of 15 psi. An initial fabric bond strength of 2.3 lb/in.-width is obtained at 23° C. using a peel rate of 2 in./min.

When using 5-7 mil films of unmodified Polymer B to prepare fabric T-peel bonds, an initial fabric bond T-peel strength of 0 lb/in.-width is obtained at a bonding temperature of 120° C. A bonding temperature of $\geq 200°$ C. is required to obtain the maximum bond strength with films of unmodified Polymer B.

EXAMPLE 14

A melt blend is prepared by blending pellets of a poly(hexamethylene terephthalate) copolyester containing 20 mole % 1,4-butanediol moiety [Polymer D (0.72 I.V.; Tm=125° C.; $\Delta H_f=9$ cal/g); 75 grams] with pellets of poly(butylene adipate) [0.70 I.V.; Tm=57° C.; $\Delta H_f=16$ cal/g; 25 grams] in a Brabender extruder at an extrusion temperature of 150° C. The resulting blend is then cryogenically ground and sieved to obtain a coarse powder (40-70 U.S. mesh).

The coarse powder is randomly sprinkled on a bonded polyester nonwoven pad to give a uniform coating weight of 20 grams per 930 cm². The coated pad is heated under an infrared heater bank for 30 seconds at 130°–150° C. to lightly fuse the powder. Less than 1% of the powder remains unfused after this treatment.

The coated pad 10 cm×15 cm is bonded to a 10 cm×15 cm fabric backed poly(vinyl chloride) sheeting on a Sentinel heat sealer (both platens heated; platens are 2.54 cm wide) at a bonding temperature of 155° C. for 10 seconds at 1619 gm/cm² gage bonding pressure to give a 15 cm wide bond. The bond is quenched immediately on a stone bench top. Three 1 inch (2.54 cm) wide strips are cut from the center of the laminate. These T-peel bonds are tested on an Instron machine at 20 cm/min. crosshead speed. Bonds made with the blend have an average peel strength of 1840 gm/linear cm at 80° C. with pad failure.

When attempts are made to fuse unmodified coarse powder of Polymer D on the nonwoven pad, much of the powder is unfused and the powder falls off the pad. This unmodified Polymer D is not useful in this bonding application.

The invention has been described in detail with particular reference to preferred embodiments thereof, but it will be understood that variations and modifications can be effected within the spirit and scope of the invention.

We claim:

1. Composition comprising a blend of about 5–95% by weight of a copolyester selected from (a), (b), or mixtures thereof with about 95–5% by weight of (c) which are defined as follows:
    (a) a crystallizable copolyester having a melting point of about 100°–190° C. a heat of fusion of less than 10 calories per gram and an I.V. of about 0.4–1.6, the copolyester being derived from an acid component of at least 50 mole % terephthalic acid and a glycol component selected from the roup consisting of 1,4-butanediol, 1,6-hexanediol and combinations thereof, the copolyester also being derived from about 20–50 mole % of a co-acid or about 20–60 mole % of a co-glycol, or about 20–75 mole % of a combination of a co-acid and a co-glycol, the co-acid and co-glycol being selected from the group consisting of isophthalic acid, $C_3$–$C_{12}$ aliphatic dibasic acids, aliphatic and cycloaliphatic glycols having 2–8 carbon atoms and diethylene glycol, the total of the acid component and the glycol component each being 100 mole %;
    (b) a substantially amorphous copolyester having a glass transition temperature of 50° C. or higher, a heat of fusion of less than 1 calorie per gram and an I.V. of about 0.4–1.2, the copolyesters being derived from at least one acid selected from the group consisting of terephthalic acid, isophthalic acid, and 1,4-cyclohexanedecarboxylic acid, and at least one glycol selected from the group consisting of ethylene glycol, diethylene gglycol, and 1,4-cyclohexanedimethanol, with the proviso that the copolyester contains at least two acids or at least two glycols, the second acid or glycol being present in an amount of about 25–60 mole %; and
    (c) a highly crystalline aliphatic homo- or copolyester having a melting point of about 40°–90° C. an I.V. of about 0.4–1.5 and a heat of fusion of greater than 10 cal/g., said homo- or copolyester essentially being derived from at least one aliphatic dibasic acid having 4 to 12 carbon atoms and at least one aliphatic glycol having 2 to 8 carbon atoms.

2. Composition according to claim 1 wherein said crystallizable copolyester contains repeat units from terephthalic acid, glutaric acid, 1,4-butanediol and diethylene glycol.

3. Composition according to claim 1 wherein said crystallizable copolyester contains repeat units from terephthalic acid, isophthalic acid, 1,4-butanediol and 1,6-hexanediol.

4. Composition according to claim 1 wherein said substantially amorphous copolyester contains repeat units from terephthalic or isophthalic acid, and 1,4-cyclohexanedimethanol, ethylene glycol, or diethylene glycol.

5. Composition according to claim 1 wherein said highly crystalline aliphatic homo- or copolyester contains repeat units from succinic, glutaric, adipic or 1,12-dodecanedioic acid, and repeat units from ethylene glycol, 1,4-butanediol, 1,5-pentanediol, 1,6-hexanediol or 1,4-cyclohexanedimethanol.

6. Composition according to claim 1 in finely divided particulate form.

* * * * *